United States Patent [19]
Demizu et al.

[11] Patent Number: 5,109,151
[45] Date of Patent: Apr. 28, 1992

[54] GLOW PLUG ENERGIZATION APPARATUS

[75] Inventors: Akira Demizu; Katsuhiro Higashibata, both of Himeji, Japan

[73] Assignee: Mitsubishi Denki Kabushiki Kaisha, Tokyo, Japan

[21] Appl. No.: 682,275

[22] Filed: Apr. 9, 1991

[30] Foreign Application Priority Data

Apr. 11, 1990 [JP] Japan ................... 2-96717

[51] Int. Cl.$^5$ ............................................. H05B 1/02
[52] U.S. Cl. ................................... 219/519; 219/497; 219/505; 219/508; 219/205; 123/179.21
[58] Field of Search ....................... 219/202–206, 219/494, 497, 501, 505, 506, 519, 491; 123/179 B, 179 H, 179 BG

[56] References Cited

U.S. PATENT DOCUMENTS

| 4,673,797 | 6/1987  | Weirick        | 219/203 |
| 4,884,018 | 11/1989 | Meuret et al.  | 219/203 |
| 4,939,347 | 7/1990  | Masaka et al.  | 219/205 |
| 4,967,137 | 10/1990 | Canitrot et al.| 219/203 |
| 4,994,683 | 2/1991  | Yamamoto       | 219/205 |

FOREIGN PATENT DOCUMENTS 0286510 10/1988 European Pat. Off. .
72675 4/1983 Japan .

Primary Examiner—Mark H. Paschall
Attorney, Agent, or Firm—Sughrue, Mion, Zinn, Macpeak and Seas

[57] ABSTRACT

A controller 3a for a Diesel engine, supplied with source voltage from a DC voltage source (battery) 1 and controlling the current supply to the glow plug 4a via a glow relay 6, includes, in addition to a microcomputer 13 and a reset circuit 14, etc., a source voltage step-up circuit 2. The source voltage step-up circuit 2 includes a source voltage detection circuit, and when the source voltage drops below a predetermined normal level, the circuit steps it up (i.e., raises it) to above the normal level. Thus, even when the engine is started at a low temperature and the source voltage falls below the normal level during the cranking of the engine, the glow plug 4a can be heated to a temperature at which the engine can be started.

3 Claims, 3 Drawing Sheets

GLOW PLUG ENERGIZATION APPARATUS

BACKGROUND OF THE INVENTION

This invention relates to auxiliary devices for starting an engine, and more particularly to controllers for controlling the current supply to the glow plugs of Diesel engines.

In the case of conventional circuits for the glow plugs of Diesel engines, etc., a judgment means for determining whether the source voltage has fallen below a predetermined normal level is provided in the controller for the glow plug. When the source voltage falls below the normal level, the control of the current supply to the glow plug is suspended and the circuit is reset. The reset of the circuit is released and the control of the current supply to the glow plug is resumed only after the source voltage rises above the normal level.

The conventional auxiliary devices for starting an engine thus have the following disadvantage.

A large amount of power must be supplied from the battery to the engine starter at the start of the engine. Thus, when the capacity of the power source battery is small or the ambient temperature is low, the source voltage of the controller falls below the normal level. Under such circumstances, the circuit does not function properly and the engine cannot be started.

SUMMARY OF THE INVENTION

It is therefore an object of this invention to provide an auxiliary device for starting an engine which properly functions even when the source voltage falls below a predetermined normal level.

The above objects are accomplished in accordance with the principle of this invention by an auxiliary device for starting an engine comprising: a voltage source; a heater means for heating said engine; a controller means for controlling a supply of current to said heater means, said controller means thereby controlling a temperature of said heater means to a level at which the engine can be started; a reset means for resetting said controller means when an interior voltage of said controller falls below a predetermined level; a source voltage detection means for detecting a voltage of said voltage source; and a source voltage step-up circuit means for stepping up the source voltage supplied from the voltage source when the voltage detected by said source voltage detection means falls below the predetermined level, the source voltage step-up circuit means thereby maintaining the interior voltage of the controller above the predetermined level. Preferably, the heater means comprises a glow plug(s) for heating the cylinder(s) of a Diesel engine. Further, it is preferred that the controller means comprises: a glow relay for turning on and off a current supplied from the voltage source to the glow plug; a temperature detector means for detecting a temperature of the glow plug; and a microcomputer for controlling said glow relay in response to the temperature of the glow plug detected by said temperature detector means, thereby controlling the temperature of the glow plug to a level at which the engine can be started.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
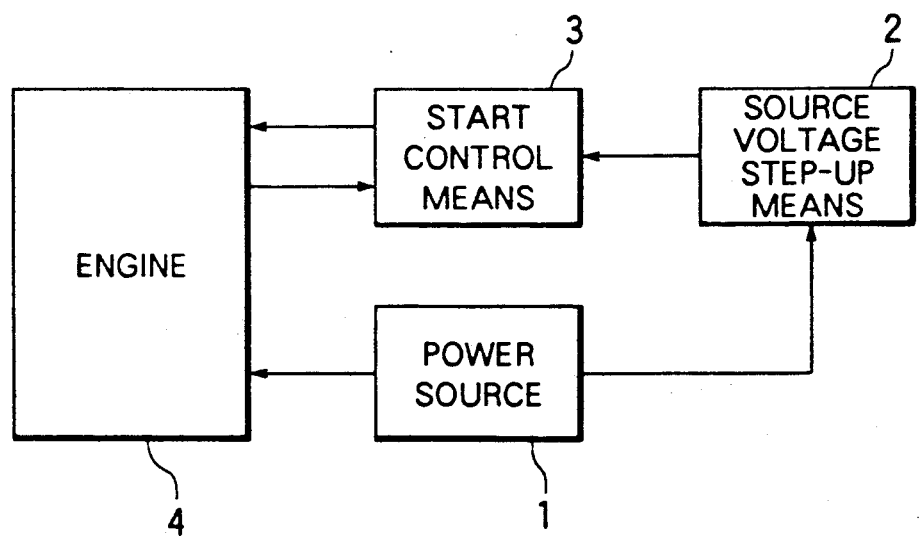
FIG. 1 is a block diagram showing the overall organization of the auxiliary device for starting an engine (circuit for controlling the current supply to the glow plug of a Diesel engine)

FIG. 1 is a block diagram showing the conceptual organization of the auxiliary device for starting an engine (control circuit for the glow plug of an automotive Diesel engine) according to this invention. The power from the DC voltage source (battery) 1 is supplied, directly or via a source voltage step-up means 2, to a start control circuit means 3. The glow plug of an engine (Diesel engine) 4, is supplied from and controlled by the start control circuit means 3. The starter of the engine 4 is also supplied from the DC voltage source (battery) 1.

Figure 2:
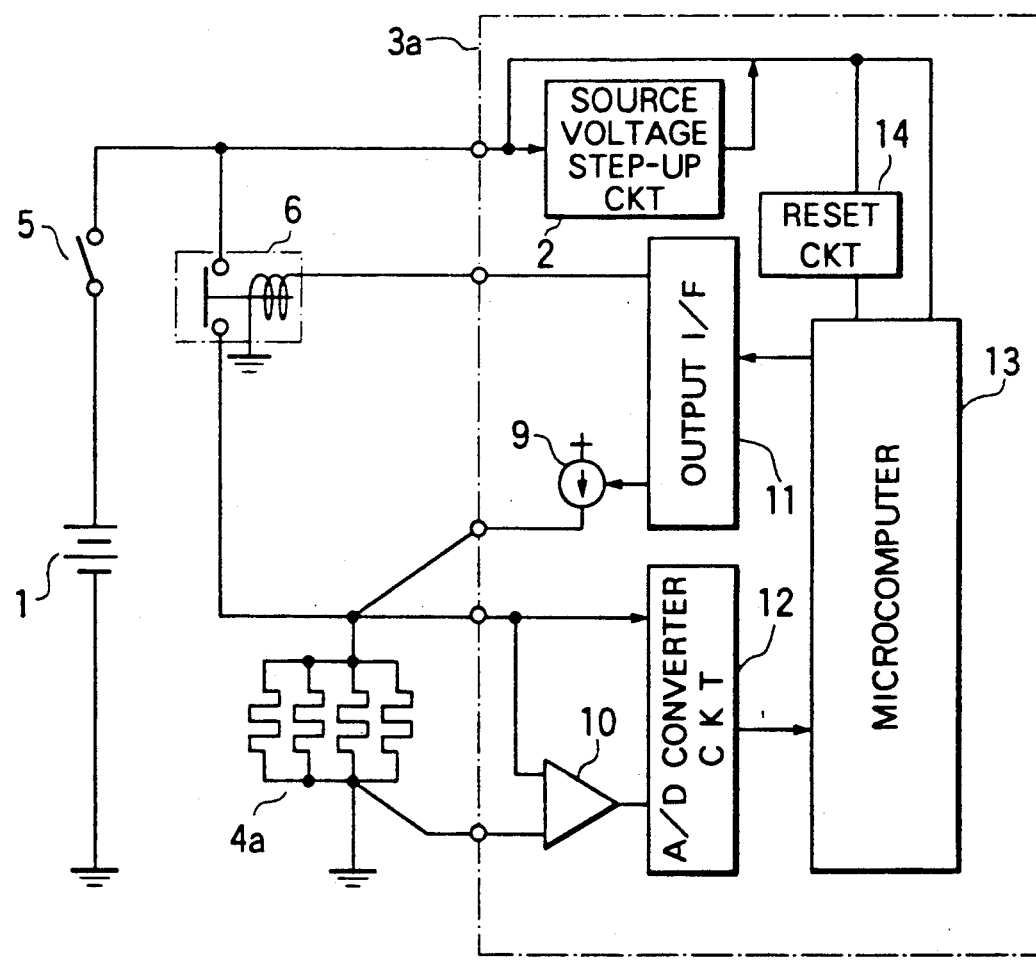
FIG. 2 is a circuit diagram showing the details of the auxiliary device for starting an engine shown in FIG. 1.

FIG. 2 shows the implementation details of the circuit of FIG. 1. A controller 3a supplied with voltage from the DC voltage source (battery) 1 via a key switch 5 and controlling a glow plug(s) 4a via a glow relay 6 includes: a source voltage step-up circuit 2 for stepping up (i.e., raising) the source voltage supplied to the controller 3a; a constant current source 9 for supplying a detection current to the glow plug 4a during the time when the glow relay 6 is opened; an amplifier 10 for amplifying to a predetermined level the voltage drop generated across the glow plug 4a by the current flowing from the constant current source 9; an output interface 11 for the microcomputer 13; an A/D converter 12 for converting analog signals into digital signals; a microcomputer 13 for effecting the control operation; and a reset circuit 14 for resetting (and thus stopping the control operation of) the controller 3a when the source voltage supplied to the controller 3a drops below a predetermined normal level.

The method of operation of the circuit of FIG. 2 is as follows.

Figure 3:
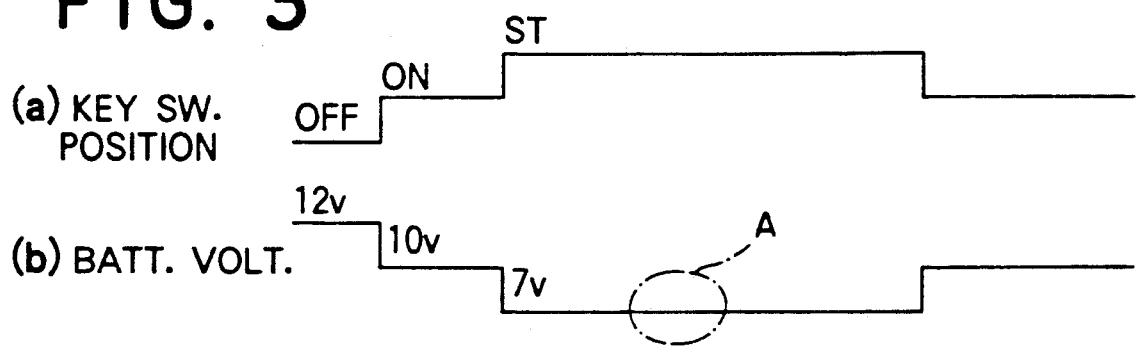
FIG. 3 shows the variation of the battery voltage (the curve (b)) in relation to the key switch position (the curve (a))

First, when the key switch 5 of the automobile is turned from the OFF to the ON position as shown at FIG. 3 (a), the source voltage is supplied from the DC voltage source (battery) 1 to the controller 3a. Then, as shown at FIG. 3 (b), the source voltage (battery voltage) falls from the original 12 V to 10 V, which is still above the predetermined normal level. In accordance with the procedure stored in the microcomputer 13, the microcomputer 13 thus turns on (closes) the glow relay 6 via the output interface 11 to supply source voltage to the glow plug 4a. The microcomputer 13 controls the ON/OFF of the glow relay 6 via the output interface 11, such that the temperature of the glow plug 4a is controlled to above the temperature level at which the engine 4 can be started.

The control of the temperature of the glow plug 4a is effected by controlling the ON/OFF of the glow relay 6. During the time when the glow relay 6 is turned off, a constant detection current is supplied from the constant current source 9 to the glow plug 4a, and the voltage drop across the glow plug 4a is inputted to the microcomputer 13 via the amplifier 10 and the A/D converter 12. The temperature of the glow plug 4a is thus calculated by the microcomputer 13. In response thereto the microcomputer 13 controls the current supply to the glow plug 4a.

When the key switch 5 is turned from the position ON to the start position ST as shown in FIG. 3 (a), the voltage of the DC voltage source (battery) 1 is further reduced. When the capacity of the DC voltage source (battery) 1 is small or the ambient temperature is low, the (average) voltage of the DC voltage source (battery) 1 may thus fall, for example, to about 7 V, which is barely above the normal level. When the key switch 5 is turned to the start position, the voltage from the DC voltage source (battery) 1 is supplied to the starter of the engine 4 to start the cranking of the engine. Thus, although the voltage of the DC voltage source (battery) 1 is represented at the constant level 7 V in FIG. 3 (b), the voltage at this stage fluctuates and attains its minima at the compressions strokes of the cranking of the engine 4, as shown at FIG. 4 (a), which enlarges the portion A of the curve (b) of FIG. 3.

Figure 4:
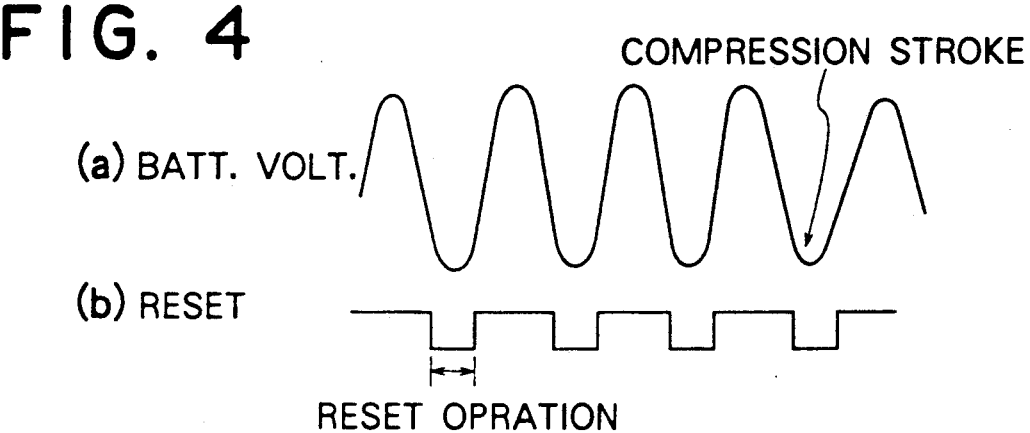
FIG. 4 shows the details of the variation of the battery voltage (the curve (a)) and the reset operation (the curve (b)) of a conventional controller.

Thus, if the source voltage step-up circuit 2 according to this invention is not provided, the reset circuit 14 operates intermittently, as shown at FIG. 4 (b), to reset the controller 3a. Each time the reset circuit 14 operates, the microcomputer 13 and the output interface 11 are initialized, and the supply of current to the glow plug 4a via the glow relay 6 is turned off. The compression strokes during the cranking of the engine 4 occur every several hundred milliseconds, and hence the source voltage repeatedly drops below the normal level at the same period when the engine 4 is started at a low ambient temperature, thereby triggering intermittently the reset circuit 14. Thus, the temperature of the glow plug 4a cannot be controlled to above the level at which the engine 4 can be started.

Figure 5:
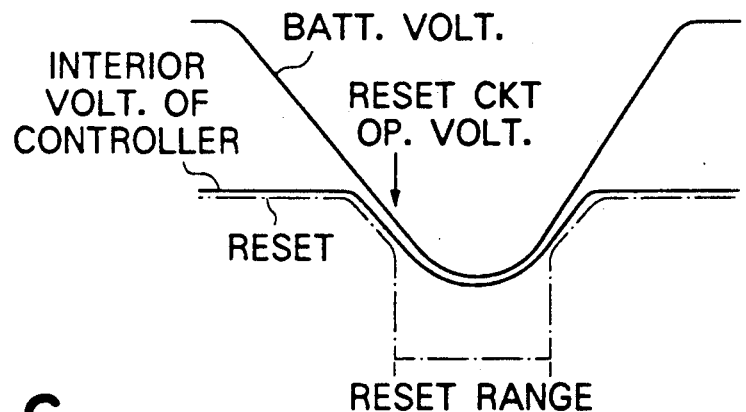
FIG. 5 shows the details of the operation of the reset circuit in the case of a conventional controller.

FIG. 5 shows the details of the operation of the reset circuit 14 in the case where the source voltage step-up circuit 2 according to this invention is not provided. When the voltage of the DC voltage source (battery) 1 falls below a predetermined level during a compression stroke of the cranking of the engine 4, the interior voltage of the controller 3a, which is maintained by an interior constant voltage source at a predetermined level, falls with the voltage of the DC voltage source (battery) 1, and thus triggers the operation of the reset circuit 14, as represented by a dot-and dash curve in FIG. 5.

According to this invention, however, the controller 3a comprises the source voltage step-up circuit 2, which includes a source voltage detection circuit means for detecting the voltage (or voltage drop) of the DC voltage source (battery) 1. Thus, when the voltage of the DC voltage source (battery) 1 falls below the predetermined normal level, the source voltage detection circuit means detects this, and in response thereto, the source voltage step-up circuit 2 steps up (i.e., raises) the source voltage of the controller 3a above the normal level. Thus, even when the voltage of the DC voltage source (battery) 1 falls intermittently below the normal level during the cranking of the engine, as shown in FIG. 4 (a), the reset circuit 14 is not triggered since the source voltage of the controller 3a is stepped up by the source voltage step-up circuit 2.

Figure 6:
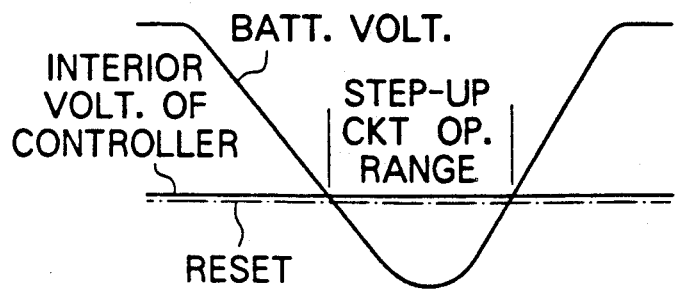
FIG. 6 shows the details of the operation of the reset circuit in the case of the controller of FIG. 2 according to this invention.

FIG. 6 shows the details of the voltage variations of the circuit of FIG. 2 provided with the source voltage step-up circuit 2 according to this invention. Even when the voltage of the DC voltage source (battery) 1 drops below the normal level, the interior voltage of the controller 3a is maintained at a constant level via the source voltage step-up circuit 2. Thus, the reset operation of the reset circuit 14, represented by a dot-and-dash curve, is not triggered.

The above embodiment concerns the case where the controller 3a includes a microcomputer 13. However, this invention is also applicable to analog type controllers (except for those of the ratio-metric type) which may also suffer malfunctioning when the source voltage falls.

What is claimed is:

1. An auxiliary device for starting an engine, comprising:
    a voltage source (1);
    heater means (4a) for heating said engine;
    controller means (3a) for controlling a supply of current to said heater means and for attendantly controlling a temperature of said heater means to a level at which the engine can be started;
    reset means (14) for resetting said controller means when an interior voltage of said controller falls below a predetermined, normal level;
    source voltage detection means (2) for detecting a voltage of said voltage source; and
    source voltage step-up circuit means (2) for increasing the source voltage supplied from the voltage source to the controller when the voltage detected by said source voltage detection means falls below the predetermined, normal level, the source voltage step-up circuit means thereby maintaining the interior voltage of the controller above the predetermined, normal level and attendantly preventing the reset means from resetting the controller means.

2. An auxiliary device for starting an engine as claimed in claim 1, wherein said heater means comprises a glow plug for heating a cylinder of a Diesel engine.

3. An auxiliary device for starting an engine as claimed in claim 2, wherein said controller means comprises:
    a glow relay (6) for turning on and off a current supplied from the voltage source to the glow plug;
    temperature detector means (9, 10, 12) for detecting a temperature of the glow plug; and
    a microcomputer (13) for controlling said glow relay in response to the temperature of the glow plug detected by said temperature detector means, thereby controlling the temperature of the glow plug to a level at which the engine can be started.

* * * * *